L. TREADWELL.
Car-Brake.
No. 6,273.
Patented Apr. 3, 1849.
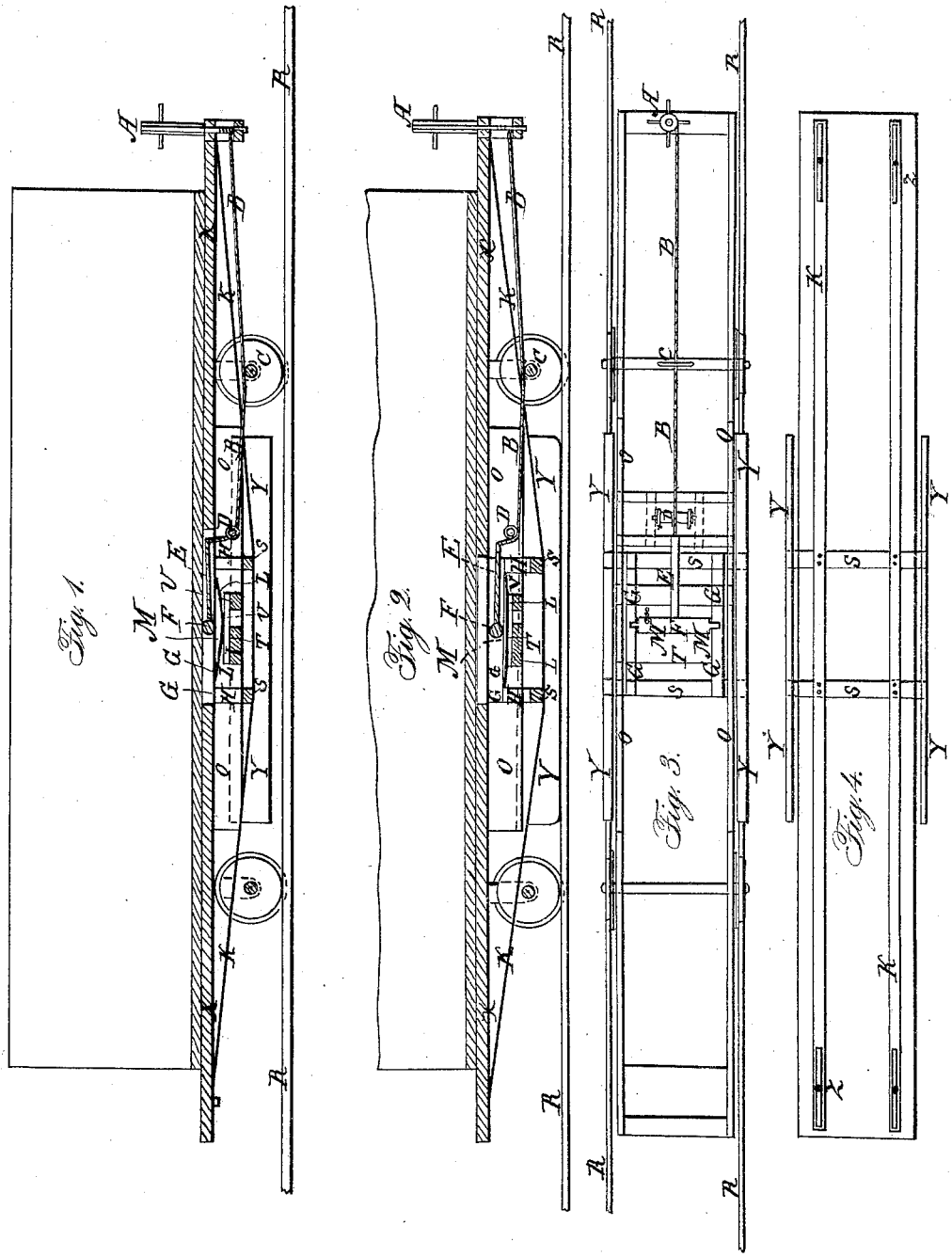

UNITED STATES PATENT OFFICE.

LEVERETT TREADWELL, OF NEW YORK, N. Y.

BRAKE FOR RAILROAD-CARS.

Specification of Letters Patent No. 6,273, dated April 3, 1849.

*To all whom it may concern:*

Be it known that I, LEVERETT TREADWELL, of New York, have invented a new and useful improvement on the mode of arresting and stopping locomotives and railroad-cars when in motion on the track-rails to prevent accident from collision or other cause; and I do hereby declare that the following is a full, clear, and exact description of the construction and operation of the same, reference being had to the annexed drawings, making a part of this specification.

My invention consists of a truck, with runners, of the ordinary shape, constructed in the usual manner, attached to, and placed underneath the bodies of locomotives and rail road cars.

The truck is so contrived, as to be raised from the rails by means of springs, and lowered thereto by the operation of capstan, windlass, and chains, the action of which is hereinafter explained. When raised off the rails, no interruption takes place with the action of the car wheels, and when lowered, so as to bear upon, and run on the rails, the friction thereby caused, is calculated to retard, and stop the velocity. In addition to this, the machinery of my invention can be readily operated upon, so as to press the runners of the trucks to the rails, and effectually arrest the progress of the cars.

Figures 1 and 2 are longitudinal sections of a rail road car, and the truck, which is the subject of my invention, the former showing the truck suspended—the latter showing the truck down, and the runners pressed on the rails.

X X is the framing for the floor of the rail road car upon which the body of the car rests.

R is one of the rails on which the car runs.

A is the capstan, the lower end of which is notched, and smaller in the diameter, so as to allow the upper part to turn upon the floor of the car, the lower end revolving upon an iron plate fixed with bolts, and nuts, in the ordinary way, to the framing of the floor, of the car, or locomotive.

B is a chain, which I call a friction chain, fastened with eye bolt, to the lower end of the capstan, and after being passed around the octangular, and center part of the axle tree $c$, of the car wheels, and under the pulley D, is secured to an eye bolt in the lever E.

C is the axle tree of one pair of the car wheels, the center part of which is octangular, each face being concave, longitudinally, so as to retain the friction chain working in the center of the axle tree, and to hold the latter with better effect.

D is a roller turning on its axle, in bearings, fixed to the framing of the car, contrived for the purpose, so as to guide the chain B, and afford a purchase for it, by which the lever E, to which it is connected shall be pulled downwards, when the capstan A, is turned for that result, and also when the axle tree $c$ draws around it the friction chain B.

F is a windlass its ends resting upon, and turning in windlass beams G G.

E is a lever, or arm, mortised and bolted to windlass F.

M M are chains, one of them being fastened to eye bolts, securely fixed into the transverse beam T, which latter is mortised, and bolted into the side frame $o$, that supports the floor of the locomotive, or rail road car, the other ends fastened to eye bolts secured to the windlass F.

Thus will be seen the manner by which the truck, or brake, is connected with the car, and capstan A, by means of the chains M M, windlass F, lever E, and friction chain B.

Y Y are runners to which the cross pieces S S, are attached by mortise, and tenon, secured by pins, the runners being flanged, and shod with soft malliable iron.

H H are upright posts, mortised, and secured to the cross pieces S S, of the framing of the truck, having their upper parts mortised into, and pinned to the windlass beams G G.

L L are springs resting upon the framing $v, v$, of the rail road car, and secured to it by bands and nuts, in the usual way. These springs, operate on the under part of the windlass beams, when the friction chain B, is released by reversing the capstan A, and suspend the truck, or brake, keeping the runners from touching the track rails.

Fig. 3 is a plan of a rail road car, showing the parts of my improved brake. Fig. 4 is a plan of the under part of a rail road car, showing the iron bars, and their operation.

K K are iron bars, the center parts of which, are secured to the underside of cross pieces $s$ $s$, of the brake by bolts, and nuts, the ends having slots, so that they may slide against guide pins $z$ $z$, secured to the framing of the bottom of the car, or locomotive, in order that the runners of the truck, may bear fully on the track rails R, R, and also prevent their getting in contact with the wheels of the car, or locomotive.

The operation of my improved brake is thus—as soon as the friction chain B, is tightened by the turning of the capstan A, and brought in close contact so as to gripe the octangular part of the axle tree $c$, of the car wheels the velocity of the axle tres retation, will carry with it the friction chain B, around its periphery, and draw down the lever E, windlass F, and consequently the truck, by reason of chains M M, being fastened securely to windlass F and transverse beam T. This action upon the chains, lever, windlass and truck, will thereby continue to increase the pressure, and friction of the runners, upon the track rails, till the motion of the car wheels is stopped.

The advantage which my improved brake has over the present mode of stopping the cars is thus—the brake now in use is applied to the wheels, which if stopped suddenly, they being of cast iron and hard slide on the track rails, affording but little friction, and, obstruction, until by friction heat, they are cut down square, and ruined, then again if the wheels are not stopped, in both cases the cars seldom bring up quick enough to prevent accident. Whereas the shoing of the runners of my improvement, being of soft malleable iron, and the runners presenting a greater friction surface on the track rails, operated upon by instantaneous action, is calculated from the immense pressure, and amount of friction produced, to be the most effectual brake possible.

The following advantages are also obvious: 1st, the runners occupying nearly the whole space between the forward, and hind wheels of the passenger cars, will prevent accident, by peoples falling under, or upon the track rails; 2d, should the wheels, or the axle trees break, the car falls on the truck and stops itself; 3, the passenger cars having the brake attached being the last cars in the train, operate as a dead drag, and pull back, when power is applied to the capstan, in succession, or simultaneously, as emergency may require.

Having thus fully described the manner in which I construct my horizontal brake, and the operation of the same, what I claim therein as new, and desire to secure by Letters Patent, is—

The application of a truck to locomotive, and railroad cars, so as to act upon the track rails, in combination with its several parts, constructed as specified, operating in the manner substantially as described, and for the purpose set forth; and it is hereby distinctly understood that I do not intend by this claim to limit myself to the precise form of said horizontal brake, but to vary the construction, and machinery, and apply such as may be deemed expedient, while the effect produced s substantially the same.

LEVERETT TREADWELL.

Witnesses:
I. E. STEWART,
A. SNOW.